United States Patent
Stangeland et al.

[11] Patent Number: 5,310,265
[45] Date of Patent: May 10, 1994

[54] AXIALLY FED HYDROSTATIC BEARING/SEAL

[75] Inventors: Maynard L. Stangeland, Thousand Oaks; Robert F. Beatty, West Hills, both of Calif.

[73] Assignee: Rockwell International Corporation, Seal Beach, Calif.

[21] Appl. No.: 76,885

[22] Filed: Jun. 15, 1993

[51] Int. Cl.⁵ .................. F16C 32/06; F01D 11/08
[52] U.S. Cl. ...................................... 384/100; 384/114; 415/170.1
[58] Field of Search ............... 384/100, 114, 118, 119, 384/120; 415/170.1, 171.1

[56] References Cited

U.S. PATENT DOCUMENTS

| | | | |
|---|---|---|---|
| 4,396,302 | 8/1983 | Drevet et al. | 384/100 X |
| 4,486,105 | 12/1984 | Miyake et al. | 384/114 |
| 4,671,676 | 6/1987 | Chen et al. | 384/100 |
| 4,684,318 | 8/1987 | Mulders | 384/118 X |
| 4,726,692 | 2/1988 | Jansing et al. | 384/100 X |
| 4,927,326 | 5/1990 | von Pragenau | 415/170.0 |
| 5,017,023 | 5/1991 | Sharrer et al. | 384/114 |

OTHER PUBLICATIONS

Extending the life of the SSME HPOTP through the use of Annular Hydrostatic Bearings, Scharrer, Hibbs, Nolan and Tabibzadeh.

AIAA 92-3401 AIAA/SAE/ASME/ASEE 28th joint Propulsion Conference and Exhibit Jul. 6-8, 1992 Nashville, Tenn.

von Pragenau R., Damping Seals for Turbomachinery NASA TP-1987, Mar., 1982.

*Primary Examiner*—Thomas R. Hannon
*Attorney, Agent, or Firm*—H. Fredrick Hamann; Harry B. Field; Steven E. Kahm

[57] ABSTRACT

This invention relates to a hydrostatic bearing having a journal 3 annularly circumscribed by a bearing 2 wherein a high pressure fluid is forced between the bearing and the journal axially. The high pressure fluid flowing axially along the journal in the bearing keeps the journal centered. A roughened or diamond knurled 11 inside surface interrupts the circumferential and axial flow of the fluid for improved rotor stability and less leakage. Other features include a tapered inner bore 9 to increase the bearing stiffness and a sharp edged inlet for greater control of the bearing stiffness and damping. The axially fed hydrostatic bearing combines the seal function and the bearing function for annular fluid flows along a journal.

13 Claims, 2 Drawing Sheets

AXIALLY FED HYDROSTATIC BEARING/SEAL

BACKGROUND OF THE INVENTION

1. Field of the Invention

This invention relates to hydrostatic bearings for rotating journals, and is particularly concerned with journals used in high pressure turbopumps.

2. Description of the Related Art

Hydrostatic bearings are employed in turbomachinery to provide rotor support and damping by maintaining a thin film of fluid under pressure in the space between the journal and the bearing member to avoid physical contact between these solid parts during operation.

Many designs of hydrostatic bearings exist, most of which use radially fed fluids to the center of the bearing and employ seals in the bearing sump area to maintain the fluid under pressure between the journal and the bearing member. The bearing may come in contact with the journal particularly during start up and shut down of the turbomachine. The resultant rubbing wears the contacting surfaces resulting in an ever increasing gap, which decreases the performance of the hydrostatic bearing.

SUMMARY OF THE INVENTION

The invention combines an annular seal with a hydrostatic bearing by controlling axially fed fluid along the shaft from a high pressure side to a low pressure side. This metering of the flow through the annulus of the hydrostatic element performs the dual functions of a seal in the system while increasing the load capacity to provide bearing support and eliminating wear of the mating surfaces which is detrimental to system performance.

OBJECTS OF THE INVENTION

It is an object of the invention to increase the life of a turbopump by providing a combined bearing and seal element which reduces the wear between the journal and the bearing and increases the reliability of the turbopump.

It is a further object of the invention to increase the stiffness and damping of the hydrostatic bearing.

It is an additional object to perform the function of providing a seal for differential pressure and within the same element utilize the difference in pressure to provide radial centering of the rotor.

It is also an object of the invention to eliminate eccentricity between the bearing and seal which leads to bearing and/or seal wear.

Other objects, advantages and novel features of the present invention will become apparent from the following detailed description of the invention when considered in conjunction with the accompanying drawing.

DETAILED DESCRIPTION OF THE PREFERRED EMBODIMENT

Figure 1:
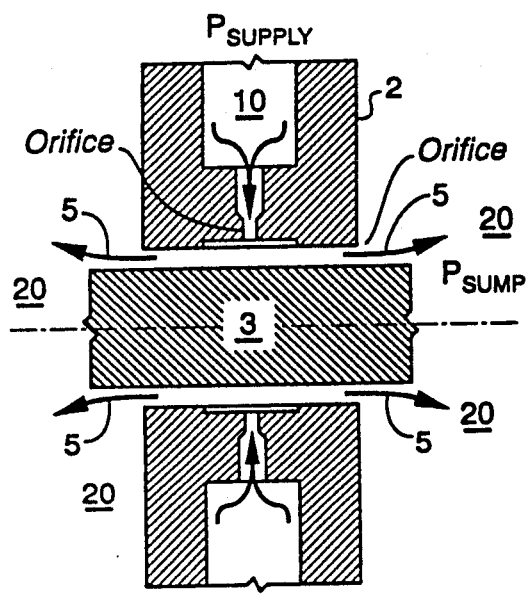
FIG. 1 is a sectional side view of a centrally fed hydrostatic bearing.

FIG. 1 shows a centrally fed hydrostatic bearing 2, wherein the supply of fluid is introduced to the bearing annularly under pressure 10 at a central point and then flows in opposite directions 5, axially along the journal 3 to a lower pressure area 20.

Figure 2:
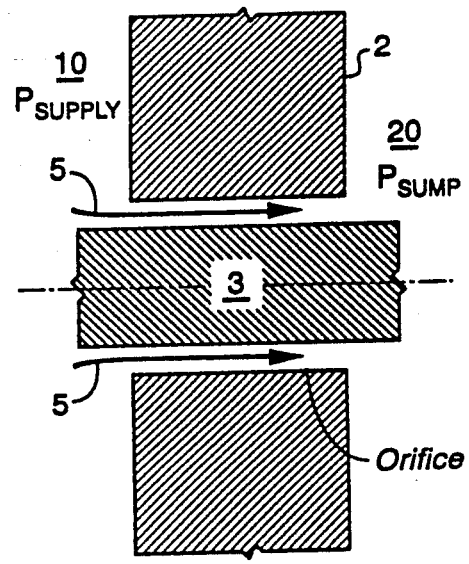
FIG. 2 is a sectional side view of an axially fed hydrostatic bearing.

FIG. 2 shows an axially fed hydrostatic bearing 2. The fluid flow 5, is from the high pressure side 10 to the low pressure side 20. The pressure created by the fluid flow 5 between the bearing 2 and the journal 3 keeps the parts from coming in contact.

Figure 3:
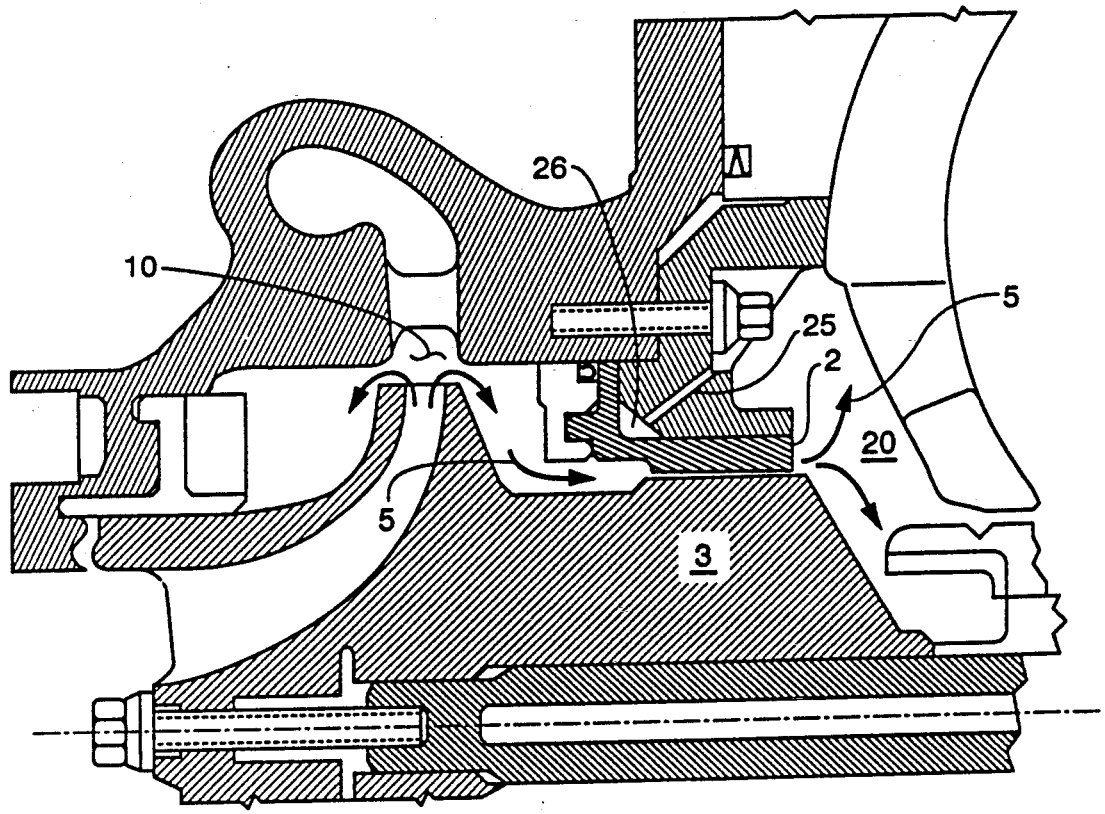
FIG. 3 is a sectional side view of a portion of the hydrostatic bearing.

FIG. 3 shows a side view of a portion of a turbopump, containing the axially fed hydrostatic bearing. The turbopump has a high pressure side 10, and a low pressure side 20, with the axially fed hydrostatic bearing inbetween. The hydrostatic bearing 2 is proximate journal 3.

Figure 4:
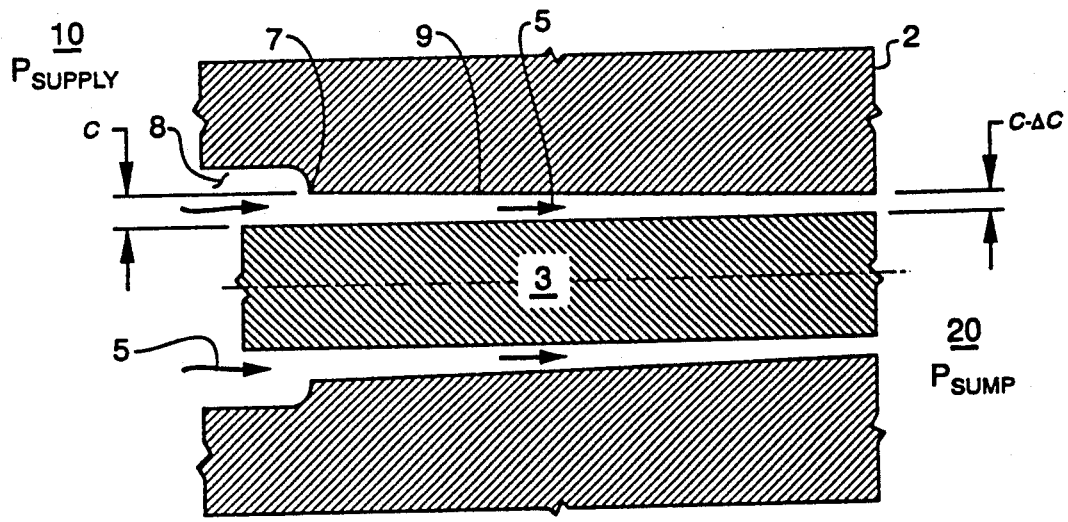
FIG. 4 is a sectional side view a tapered hydrostatic bearing showing the interaction area with the journal.
Figure 6:
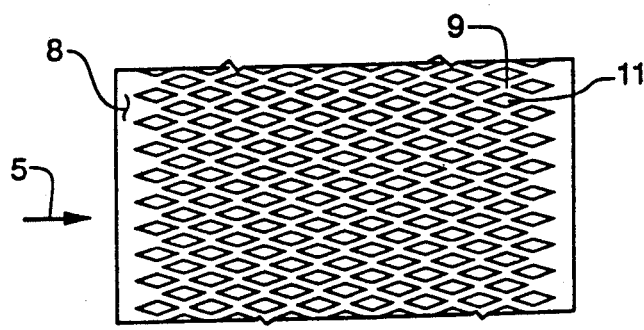
FIG. 6 is a sectional inside diameter view of the annular diamond knurl pattern used in the hydrostatic bearing.

FIG. 4 shows a close up view of the interaction area between the bearing and the journal. The bearing 2 has an inside surface 9 as shown in FIG. 6 having an array of diamond knurled indentures in the bore 11. The fluid enters the inlet portion 8 at a high pressure and then flows in direction 5, under reducing high pressure in the space between the journal 3 and the bearing 2.

The invention would work with a smooth inside surface but a roughened surface improves the function of the bearing by retarding the fluid flow through the bearing and thus increasing the damping of the hydrostatic bearing, decreasing destabilizing cross coupled forces, and reducing the leakage flow.

In the present embodiment the rough inside surface is a diamond shaped knurling 11 which retards the axial and circumferential flow of the lubricating fluid, thereby helping decrease leakage and improve rotor stability.

In the present embodiment the hydrostatic bearing is 1.25 inches long, the knurling starts 50 thousandths of an inch from the high pressure edge of the bearing and ends 70 thousandths of an inch from the low pressure end. Each diamond has a depth of 20 thousandths inches and sides which are 40 thousandths long. The leading point of the diamond has a 60 degree internal angle.

Figure 5:
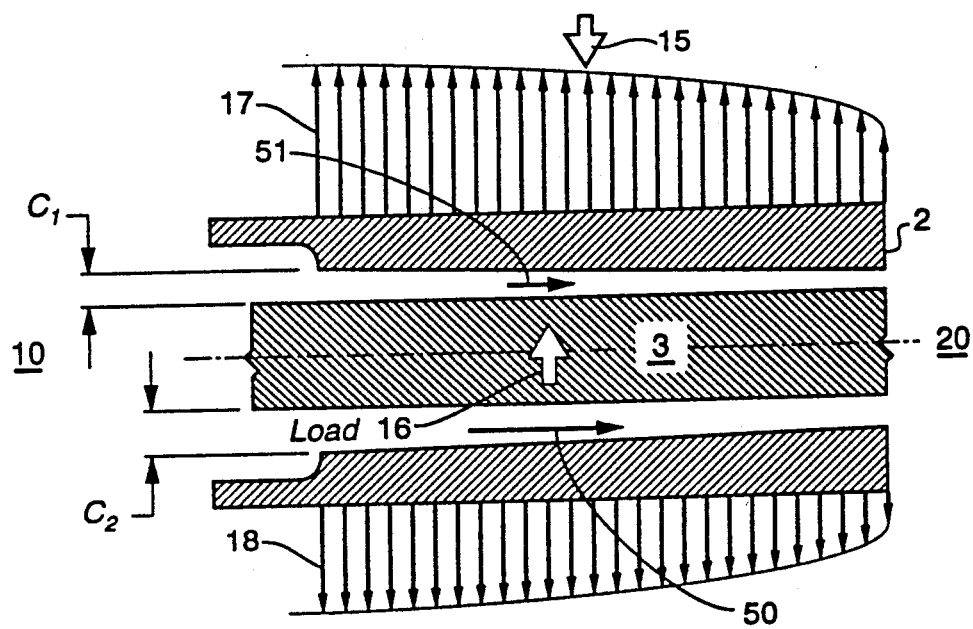
FIG. 5 is a sectional side view a straight hydrostatic bearing showing the interaction area with the journal and the restoring forces thereon.

FIG. 5 shows the restoring force vector 15 on the journal 3 which results from the pressure vectors 17 and 18. When the load from the journal forces the journal upward the pressure changes in the fluid tend to restore the journal to the center of the bearing.

As FIG. 5 illustrates, when the journal has a load vector 16 forcing the journal up, the clearance $c_1$ between the journal and the bearing wall decreases, the fluid pressure increases as indicated by pressure vectors 17 and the fluid velocity decreases as indicated by fluid flow vector 51. Simultaneously, on the opposite side of the journal, as the clearance $c_2$ increases, the pressure decreases, and the fluid flow increases, as shown by pressure vectors 18 and fluid flow vectors 50. Therefore a pressure difference force is produced which tends to restore the journal to the center of the bearing.

Note also that the pressure vectors 17 and 18 tend to lessen at the exit of the bearing providing less variation at the exit of the bearing.

Since external pressure in the hydrostatic bearing mounting support would distort the bearing bore and thereby cause rubbing with the journal, the hydrostatic bearing employs outer diameter venting 25 to reduce the pressure difference between the mount location and bore surface at cavity 26 and prevent bore distortion leading to loss of bearing performance.

A roughened annulus bore length/diameter ratio which is greater than or equal to 0.35 but less than 1.0 is used for stability improvement over conventional smooth annuluses.

The hydrostatic bearing 2 in FIG. 4 shows that the bearing may be tapered such that it has a clearance c at the high pressure end 10 of the bearing and clearance c-Δc at the low pressure end 20 of the bearing.

The bearing 2 need not be tapered for the bearing to work but tapering has the benefit of increasing the pressure at one end of the bearing to increase overall stiffness. Optimum stiffness is achieved when the inlet clearance is 2 to 3 times greater than the exit clearance.

The bearing also has a high pressure fluid inlet portion 8, with a sharp annulus bore inlet corner. The sharp edge 7, helps control the rotordynamic coefficients within a tight range as the loss coefficient for a sharp entrance has less variability.

The high pressure fluid enters the hydrostatic bearing passing the sharp edge 7 of the annulus bore inlet having a clearance of c from the journal and flows between the journal 3, and the tapered bore of the hydrostatic bearing 9, to the low pressure side of the hydrostatic bearing having a clearance of c-Δc from the journal. This converging tapered annulus increases the stiffness of the bearing.

A further advantage of having the converging tapered annulus is that during start up and shut down the journal tends to rub against the smaller diameter end of the annulus and thus does not damage the key portion of the annulus which has a greater control of the bearing performance.

The rubbing during start up and shut down can be a major problem for hydrostatic bearings. The hydrostatic bearing must be made of a material which can be rubbed and not wear or gall excessively. In the present embodiment a special work hardened, prestressed sterling silver having a mil spec of mil-s-13282 grade B, having ultimate tensile strength of 38,000 PSI min, yield strength at 0.2% offset of 32,000 PSI min, 18% elongation at 70° F. was used.

A further consideration is that the hydrostatic bearing in the embodiment used was for liquid oxygen lubrication which can ignite most metals and is thus hazardous. The sterling silver and fragments therefrom are noncombustible in the oxygen rich environment, even at high pressures.

Since the sterling silver operates in a cryogenic environment in this embodiment it was prestressed in compression into the bearing housing at room temperature to compensate for the difference in thermal contraction when at operating temperatures, and maintaining mount support control.

During start-up of the turbopump, liquid oxygen is present between the bearing and the journal helping to limit rubbing when the pressure in the hydrostatic bearing which flows axially through the bearing has not yet developed its full load carrying capacity.

As the turbopump speed increases the pressure entering the hydrostatic bearing increases such that the load carrying capacity increases faster than the journal sideload and the developing hydrostatic bearing stiffness keeps the journal from rubbing against the bearing.

The fluid film capacity builds up faster than radial load for low rubbing contact shear stresses and early lift off.

When the hydrostatic bearing is running normally the fluid film produces high stiffness and damping with low leakage.

The application of the invention to the High Pressure Oxygen Turbopump (HPOTP) on the Space Shuttle Main Engines (SSME) has been reported in a paper entitled "Extending the Life of the SSME HPOTP Through the use of Annular Hydrostatic Bearings" by J. K. Scharrer, R. I. Hibbs, S. A. Nolan, and R. Tabibzadeh which was published by the American Institute of Aeronautics and Astronautics, AIAA/SAE/ASME/ASEE 28th Joint Propulsion Conference and Exhibit, Jul. 6-8 1992. The paper is hereby made a part hereof and incorporated herein by reference.

Pressurized fluid film operation prevents metal to metal contact and wear, even in an essentially unlubricated cryogenic environment and offers the potential of unlimited life.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. An axially fed hydrostatic bearing and annular seal comprising,
   a journal annularly circumscribed by a hydrostatic bearing,
   the hydrostatic bearing having a high pressure end and a low pressure end,
   a source of high pressure fluid at the high pressure end of the bearing, where the fluid is forced to flow axially along the journal between the journal and the bearing and exiting to the low pressure end of the hydrostatic bearing,
   the fluid flow thereby providing a restoring force to the journal when it deviates from the center of the hydrostatic bearing.

2. An axially fed hydrostatic bearing and annular seal as in claim 1 wherein,
   the hydrostatic bearing has an inside surface which is tapered axially along its length.

3. An axially fed hydrostatic bearing and annular seal as in claim 1 wherein,
   the hydrostatic bearing has a sharp edge annulus bore inlet on the high pressure end.

4. An axially fed hydrostatic bearing and annular seal as in claim 1 wherein,
   the hydrostatic bearing has an inside surface with an array of diamond knurled indents in the bore.

5. An axially fed hydrostatic bearing and annular seal as in claim 1 wherein,
   the hydrostatic bearing has a roughened inside surface to effect the fluid flow.

6. An axially fed hydrostatic bearing and annular seal as in claim 1 wherein, the
   hydrostatic bearing has an inside surface and an outside surface for mounting in a housing, and a vent means to reduce the pressure differential between the inside and outside surfaces and prevent it from distorting its inside surface.

7. An axially fed hydrostatic bearing and annular seal as in claim 6 wherein,
the hydrostatic bearing has an inside surface with an array of diamond knurled indents in the bore acting as fluid cavities.

8. An axially fed hydrostatic bearing and annular seal as in claim 7 wherein,
the hydrostatic bearing has an inside surface which is tapered axially along its length.

9. An axially fed hydrostatic bearing and annular seal as in claim 8 wherein,
the hydrostatic bearing has a sharp edge annulus bore inlet on the high pressure end.

10. An axially fed hydrostatic bearing and annular seal as in claim 6 wherein,
the hydrostatic bearing has a roughened inside surface to effect the fluid flow.

11. An axially fed hydrostatic bearing and annular seal as in claim 10 wherein,
the hydrostatic bearing has an inside surface which is tapered axially along its length.

12. An axially fed hydrostatic bearing and annular seal as in claim 10 wherein,
the hydrostatic bearing has a sharp edge annulus bore inlet on the high pressure end.

13. An axially fed hydrostatic bearing and annular seal as in claim 1 wherein,
the size of the gap between the journal and the hydrostatic bearing acts as a seal to the fluid flow thereby providing journal support and damping for journal stability.

* * * * *